HARDENABLE COMPOSITIONS COMPRISING EPOXIDE COMPOUNDS AND TETRAHYDROFURANE

Hans Brueschweiler, Basel, and Paul Zuppinger, Arlesheim, Switzerland, assignors to Ciba Limited, Basel, Switzerland, a Swiss firm
No Drawing. Filed Mar. 23, 1959, Ser. No. 800,945
Claims priority, application Switzerland Feb. 5, 1959
4 Claims. (Cl. 260—2)

It is known that 1:2-oxido-compounds, such as ethylene oxide, epichlorhydrin or 1:3-[2':3'-oxidopropyl]-hydroxybenzene, can be reacted with tetrahydrofurane in the presence of Friedel-Crafts catalysts or boron trifluoride.

Owing to the fact that tetrahydrofurane itself polymerizes in the presence of Friedel-Crafts catalysts or boron trifluoride, the above known process does not lead to homogeneous hardened products. Furthermore, the reaction of epoxides with tetrahydrofurane proceeds so violently that strong local over-heating and carbonization of the hardened resin occur in large batches.

The invention is based on the unexpected observation that tetrahydrofurane does not itself polymerize when a metal fluoroborate is used as catalyst. On the other hand, the presence of the metal fluoroborate does not prevent the reaction with the compound containing epoxide groups and merely retards the speed of the reaction. This has the advantage that undesired over-heating and the disadvantageous influence on the properties of the reaction products connected therewith can be avoided more easily.

Accordingly, the present invention provides hardenable compositions which comprise an epoxide compound, which contains $n$ epoxide groups calculated on the average molecular weight, $n$ being a whole number or fractional number greater than 1, tetrahydrofurane and a metal fluoroborate.

The invention also provides a process for the manufacture of hardened resins, wherein an epoxide compound as defined above is reacted with tetrahydrofurane in the presence of a metal fluoroborate.

The epoxide compounds used in the invention have a 1:2-epoxy equivalency greater than 1.0. By the epoxy-equivalency reference is made to the average number of 1:2-epoxy groups

contained in the average molecule of the epoxide compound. Owing to the usual methods of preparation of the epoxide compounds and the fact that they are ordinarily a mixture of chemical compounds having somewhat different molecular weights and contain some compounds wherein the terminal epoxy groups are in hydrated form, the epoxy equivalency of polyepoxy compounds is not necessarily an integer of at least 2, but in all cases it is a value greater than 1.0.

As epoxide compounds of the kind defined above, which are to be reacted with tetrahydrofurane, there may be mentioned, for example, epoxidated diolefines, dienes or cyclic dienes, such as butadiene dioxide, 1:2:5:6-diepoxyhexane and 1:2:4:5-diepoxy-cyclohexane; epoxidated diolefinically unsaturated carboxylic acid esters, such as methyl-9:10:12:13-diepoxy-stearate; the dimethyl ester of 6:7:10:11-diepoxy-hexadecane-1:16-dicarboxylic acid, epoxidated compounds containing two cyclohexenyl residues, such as diethylene glycol bis-(3:4-epoxy-cyclohexane carboxylate) and 3:4-epoxy-cyclohexyl-methyl-3:4-epoxy-cyclohexane carboxylate. Furthermore basic polyepoxide compounds, such as are obtained by the reaction of a primary or secondary aromatic diamine, such as aniline or 4:4'-di-[monomethylamino]-diphenylmethane, with epichlorhydrin in the presence of an alkali.

There may also be used polyglycidyl esters, such as are obtainable by the reaction of a dicarboxylic acid with epichlorhydrin or dichlorhydrin in the presence of an alkali. Such polyesters may be derived from aliphatic dicarboxylic acids, such as oxalic acid, succinic acid, glutaric acid, adipic acid, pimelic acid, suberic acid, azelaic acid, sebacic acid and especially aromatic dicarboxylic acids, such as phthalic acid, isophthalic acid, terephthalic acid, 2:6-naphthylene-dicarboxylic acid, diphenyl-ortho:ortho'-dicarboxylic acid, ethylene glycol-bis-(para-carboxyphenyl) ether or the like. There may be mentioned, for example, diglycidyl adipate and diglycidyl phthalate and also diglycidyl esters which correspond to the average formula

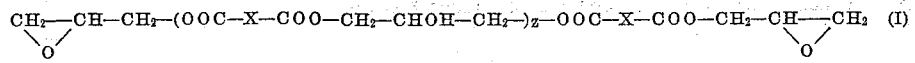

in which X represents an aromatic hydrocarbon radical, such as a phenyl group, and Z represents a whole or fractional small number.

There may also be used polyglycidyl ethers such as are obtainable by the etherification of a polyhydric alcohol or polyphenol with epichlorhydrin or dichlorhydrin in the presence of an alkali. These compounds may be derived from glycols, such as ethylene glycol, diethylene glycol, triethylene glycol, propylene glycol (1:2), propylene glycol-(1:3), butylene glycol-(1:4), pentane-diol-(1:5), hexane-diol-(1:6), hexane-triol-(2:4:6) or glycerine, and especially from polyphenols, such as phenol novolacs, cresol novolacs, resorcinol, pyrocatechol, hydroquinone, 1:4-dioxynaphthalene, bis-[4-hydroxyphenyl]-methane, bis-[4-hydroxyphenyl]-methylphenylmethane, bis-[4-hydroxyphenyl]-tolyl methane, 4:4'-dioxydiphenyl, bis-[4-hydroxyphenyl]-sulfone and especially 2:2-bis-[4-hydroxyphenyl]-propane. There may be mentioned, for example, ethylene glycol diglycidyl ether and resorcinol diglycidyl ether and also diglycidyl ethers which correspond to the average formula

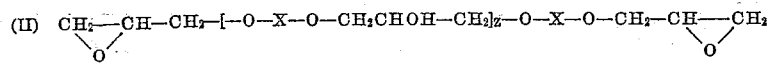

in which X represents an aromatic radical, and Z represents a whole or fractional small number.

There are especially suitable epoxy-resins that are liquid at room temperature, for example, those of 4:4'-dioxydiphenyl-dimethylmethane which have an epoxide content of about 3.8 to 5.8 epoxide equivalents per kilogram. Such epoxy-resins correspond, for example, to the average formula

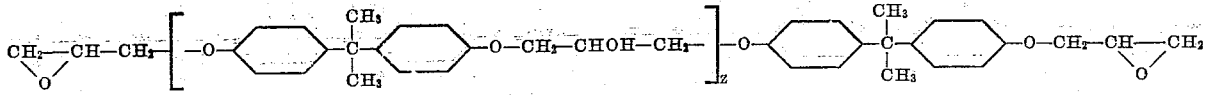

in which Z represents a whole or fractional small number, for example, between 0 and 2.

Alternatively, solid epoxy-resins may be used in the molten state or in solution.

As metal fluoroborates there may be mentioned copper, cobalt, magnesium, cadmium, mercury, calcium, strontium, barium and aluminium fluoroborates and especially zinc, tin, lead, iron and nickel fluoroborates.

The metal fluoroborates may be incorporated as such in the compositions. Alternatively, they may be used together with water or a nitrogen base, whereby complexes are probably formed with the metal fluoroborates. As such nitrogen bases there may be mentioned, for example, ammonia, ethylamine, ethylene diamine, monoethanolamine, piperidine, triethanolamine, urea, hexamethylene tetramine, trimethylamine, pyridine and especially aromatic amines, such as aniline, toluidine and Schiff's bases of such amines, for example, the Schiff's base of aniline and benzaldehyde.

Preferably a large proportion of tetrahydrofurane is reacted with the epoxide compound, the ratio of epoxide-compound to tetrahydrofurane being within the range of about 100:5–50, and advantageously 100:10–30. There are advantageously used at most one mol of tetrahydrofurane per epoxide equivalent of the epoxide compound.

The hardenable compositions of the invention may also contain suitable plasticisers or inert diluents. An addition of a plasticiser, such as dibutyl phthalate, dioctyl phthalate or tricresyl phosphate, yields a softer, elastic and flexible hardened composition. It may also be of advantage, depending on the properties desired in the hardened resin, to use an active diluent or modifying agent which reacts with the epoxy-resin under the influence of the metal fluoroborate and takes part in the hardening reaction, for example, an ethylenically unsaturated polymerizable compound, such as styrene, monoepoxide compounds, such as cresyl glycide; and there may also be incorporated under the influence of the metal fluoroborate monofunctional or advantageously polyfunctional compounds, which contain hydroxyl groups, keto groups, aldehyde groups, carboxyl groups or the like, such, for example, as dihydric or polyhydric alcohols, polyglycols or polyesters having terminal hydroxyl or carboxyl groups.

The compositions of this invention may also contain the usual additions, such as accelerators, for example, styrene oxide or organic peroxides, pigments, extenders or fillers. As extenders and fillers there may be used, for example, asphalt, bitumen, glass fibers, mica, quartz meal, kaolin or finely divided silicic acid (Aerosil) or aluminium powder.

The hardenable compositions of this invention may be used for the manufacture of rapidly hardening adhesives, lamination resins, lacquer coatings, casting resins and moulding compositions. Compositions of this invention which contain pigments or fillers of all kinds, such as finely divided silicic acid, and also plasticisers, are very suitable as filling compositions and putty-like masses.

The following examples illustrate the invention:

*Example 1*

30 grams of a liquid epoxide resin having an epoxide content of 5.2 epoxide equivalents per kilogram, and obtained by the alkaline condensation of 4:4'-dioxydiphenyl-dimethylmethane with epichlorhydrin, are mixed with 10 grams of tetrahydrofurane in which 0.4 gram of zinc fluoroborate has been dissolved, and the whole is thoroughly mixed. There is obtained a low viscosity mixture of resin and hardener, which can be kept at room temperature for about 5 days. In a casting mould the composition hardens at 120° C. in the course of 2 hours to form a hard, impact-resistant, transparent brownish moulding. By pouring the composition on a glass plate and hardening it for one hour at 60° C. and 2 hours at 120° C., there is obtained a clear colorless coating having a thickness of 81 microns and a pendulum hardness according to Persoz of 394. The Erichson value of a coating produced and hardened in an analogous manner on sheet aluminium is 10 mm. The period of use of the resins-hardener composition at 120° C. is about 20 minutes.

*Example 2*

The procedure is the same as described in Example 1, except that there is used 1:4-butane-diol diglycidyl ether, instead of the epoxy-resin used in that example. There is obtained a resin-hardener composition which can be kept at room temperature for more than 3 weeks. In a casting mould the composition hardens at 120° C. in the course of 2 hours to form a hard, impact-resistant, transparent, yellowish moulding. When the composition is poured on to a glass plate and hardened in the manner described in Example 1, there is obtained a clear colorless coating, which at a thickness of 78 microns has a pendulum hardness according to Persoz of 248.

*Example 3*

The procedure is the same as described in Example 1, except that vinyl-cyclohexene dioxide is used, instead of the epoxy-resin used in that example. There is obtained a resin-hardener composition which can be kept at room temperature for only about 3–5 minutes. In a casting form the composition hardens immediately with strong spontaneous heating to form a hard, transparent, impact-resistant moulded body.

*Example 4*

The procedure is analogous to that described in Example 1, except that tin fluoroborate is used, instead of zinc fluoroborate. There is obtained a resin-hardener composition having a period of use of 3 minutes. When lead fluoroborate is used the period of use is 10 minutes, with iron fluoroborate 28 minutes and with nickel fluoroborate 5½ minutes. When these compositions are cast onto glass plates or sheet aluminium, there are obtained after a hardening period of one hour at 60° C. and 4 hours at 120° C. coatings having the following properties:

In the case of tin fluoroborate a coating on a glass plate has a pendulum hardness according to Persoz of 383 at a thickness of 78 microns, and a coating on sheet aluminium has an Erichson value of 10 mm.; in the case of lead fluoroborate a coating on a glass plate has a pendulum hardness of 228 at 50 microns, and a coating on sheet aluminium has an Erichson value of 10 mm. In the case of iron fluoroborate a coating on a glass plate has a pendulum hardness of 384 at 68 microns, and a coating on sheet aluminium has an Erichson value of 10 mm. By hardening the compositions with the said four metal fluoroborates in the casting moulds for 30 minutes at 120° C. there are obtained very hard and impact-resistant moulded bodies.

What is claimed is:

1. A process of reacting (1) a 1,2-epoxide compound having a 1,2-epoxide equivalency greater than 1 with (2) tetrahydrofurane, which comprises contacting (1) and (2) with a metal fluoroborate selected from the group consisting of the fluoroborates of copper, cobalt, magnesium, cadmium, mercury, calcium, strontium, barium, aluminum, zinc, tin, lead, iron and nickel as a catalyst, about 5–50 parts of tetrahydrofurane being employed for every 100 parts by weight of 1,2-epoxide compound, and curing the reaction product.

2. A process of reacting (1) a 1,2-epoxide compound having a 1,2-epoxide equivalency greater than 1 with (2) tetrahydrofurane, which comprises contacting (1) and (2) with a metal fluoroborate selected from the group consisting of the fluoroborates of copper, cobalt, magnesium, cadmium, mercury, calcium, strontium, barium, aluminum, zinc, tin, lead, iron and nickel as a catalyst, about 10–30 parts of tetrahydrofurane being employed for every 100 parts by weight of 1,2-epoxide compound, and curing the reaction product.

3. A process as claimed in claim 1, wherein the 1,2-epoxide compound is a polyglycidyl ether of a polyhydric phenol.

4. A process as claimed in claim 2, wherein the 1,2-epoxide compound is a polyglycidyl ether of a polyhydric phenol.

References Cited in the file of this patent

UNITED STATES PATENTS 2,902,398   Schroeder _____ Sept. 1, 1959

FOREIGN PATENTS 200,876   Australia _____ Feb. 15, 1956
898,269   France _____ July 3, 1944